(12) United States Patent
Chan et al.

(10) Patent No.: US 10,521,245 B2
(45) Date of Patent: *Dec. 31, 2019

(54) METHOD AND SYSTEM FOR RECURSIVE PLUG-IN APPLICATION RECIPE GENERATION

(71) Applicant: Oracle International Corporation, Redwood Shores, CA (US)

(72) Inventors: Victor Chan, Santa Clara, CA (US); Udom Dwivedi, Santa Clara, CA (US); Eric Sutton, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 159 days.

This patent is subject to a terminal disclaimer.

(21) Appl. No.: 15/794,994

(22) Filed: Oct. 26, 2017

(65) Prior Publication Data

US 2018/0173542 A1 Jun. 21, 2018

Related U.S. Application Data

(60) Provisional application No. 62/435,843, filed on Dec. 18, 2016.

(51) Int. Cl.
*G06F 3/048* (2013.01)
*G06F 9/445* (2018.01)
*G06F 21/31* (2013.01)
*G06F 9/451* (2018.01)
*G06F 3/0484* (2013.01)

(52) U.S. Cl.
CPC .......... *G06F 9/44526* (2013.01); *G06F 9/451* (2018.02); *G06F 21/31* (2013.01); *G06F 3/0484* (2013.01)

(58) Field of Classification Search
CPC ...................................................... G06F 3/048
See application file for complete search history.

*Primary Examiner* — Pei Yong Weng
(74) *Attorney, Agent, or Firm* — Invoke

(57) ABSTRACT

Techniques for recursively generating a plug-in application recipe (PIAR) are disclosed. A PIAR management application manages a particular PIAR in an active state. The PIAR management application manages PIAR specifications, each identifying a trigger and an action. The action is conditional on the trigger. The particular PIAR includes a particular trigger and a particular action. The particular action includes a child PIAR specification that defines, for a child PIAR, a second trigger and a second action to be executed when the second trigger is satisfied. In response to detecting that the particular trigger is satisfied, the PIAR management application creates the child PIAR. The PIAR management application monitors the second trigger concurrently with the particular trigger, which the PIAR management application did not do before creating the child PIAR.

20 Claims, 4 Drawing Sheets

METHOD AND SYSTEM FOR RECURSIVE PLUG-IN APPLICATION RECIPE GENERATION

BENEFIT CLAIMS; RELATED APPLICATIONS; INCORPORATION BY REFERENCE

This application claims the benefit of U.S. Provisional Patent Application 62/435,843, titled "Method and System for Recursive Workflow Generation", filed Dec. 18, 2016, which is hereby incorporated by reference.

TECHNICAL FIELD

The present disclosure relates to creating plug-in application recipes.

BACKGROUND

A plug-in-application recipe ("PIAR") may be referred to as a set including a triggering event (referred to herein as a "trigger" or "trigger condition") and an action, arranged logically as an if-then formulation. The "if" portion of the formulation corresponds to a PIAR trigger condition. The "then" portion of the formulation is conditioned on the "if" portion being satisfied, and corresponds to a triggerable action. An action may itself be supplied by a plug-in application, which may be the same as, or different than, a plug-in application supplying a trigger.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features/components described in one embodiment may be combined with features/components described in a different embodiment. In some examples, well-known structures and devices are described with reference to a block diagram form in order to avoid unnecessarily obscuring the present invention.

1. GENERAL OVERVIEW
2. PLUG-IN APPLICATION RECIPE MANAGEMENT SYSTEM
3. RECURSIVE PLUG-IN APPLICATION RECIPE GENERATION
4. MISCELLANEOUS; EXTENSIONS
5. HARDWARE OVERVIEW
6. COMPUTER NETWORKS AND CLOUD NETWORKS

1. General Overview

One or more embodiments include techniques for recursively generating a plug-in application recipe (PIAR). A PIAR management application manages a particular PIAR in an active state. The PIAR management application manages PIAR specifications. Each PIAR specification identifies a trigger associated with one or more corresponding trigger variables. Values of the trigger variable(s) are exposed by a first plug-in application to the PIAR management application. The values are used to evaluate the trigger on an ongoing basis. An instance of evaluating the trigger involves determining whether a condition is satisfied based at least in part on one or more values of the one or more trigger variables. Each PIAR specification further identifies an action for which a second plug-in application exposes an interface to the PIAR management application for causing the second plug-in application to carry out the action. An instance of evaluating the action involves carrying out the action based on one or more values of one or more input variables that are input to the action in the PIAR specification. The PIAR management application makes the action conditional on the trigger on an ongoing basis.

In an embodiment, the particular PIAR specification includes a particular trigger and a particular action. The particular action includes a child PIAR specification that defines, for a child PIAR, a second trigger and a second action to be executed when the second trigger is satisfied. The PIAR management application detects that the particular trigger is satisfied. In response to detecting that the particular trigger is satisfied, the PIAR management application creates the child PIAR. The PIAR management application monitors the second trigger concurrently with the particular trigger. Before creating the child PIAR, the PIAR management application did not monitor the second trigger.

2. Plug-In Application Receipe Generation System

Figure 1:
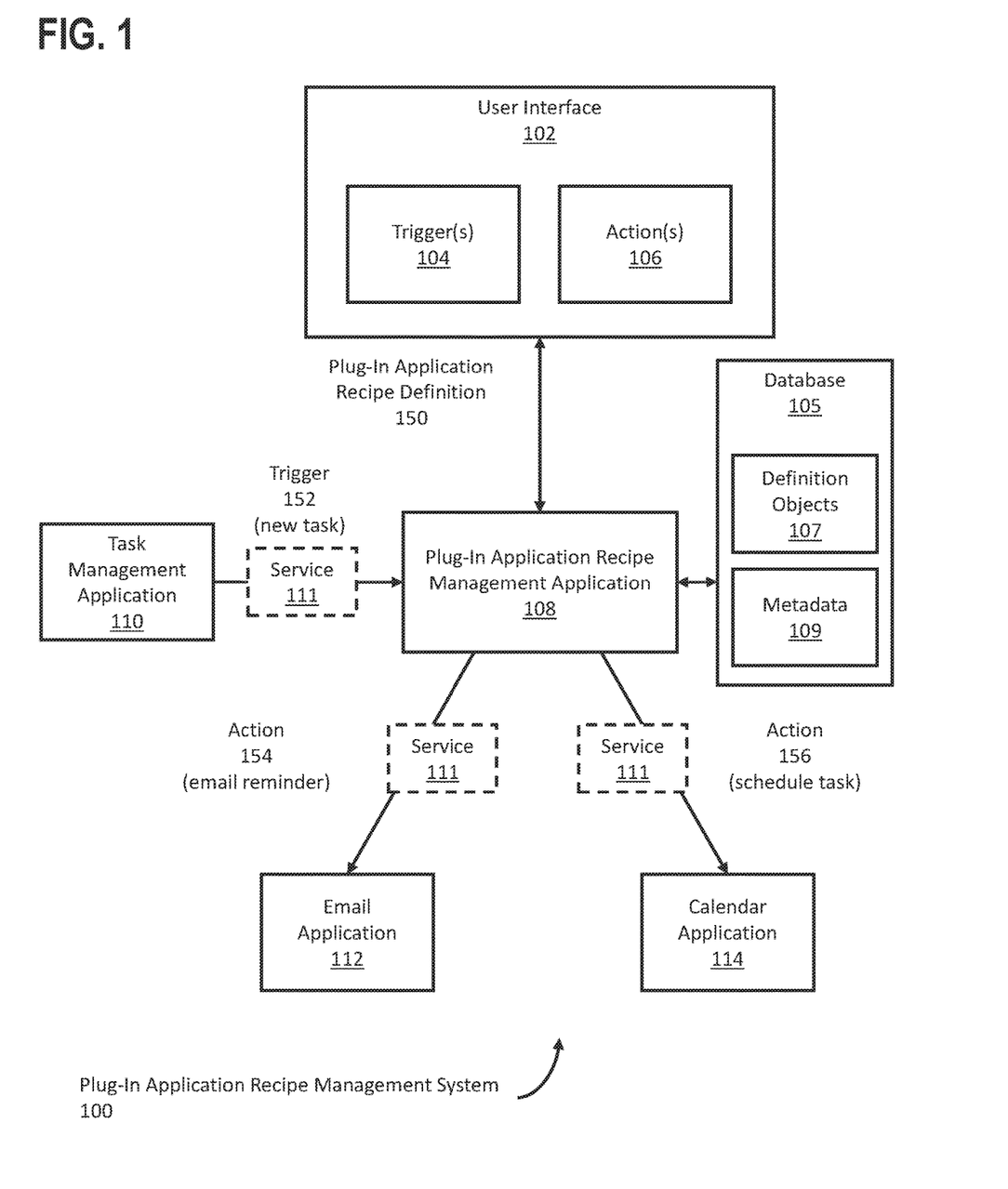
FIG. 1 is a block diagram illustrating a plug-in application recipe management system in accordance with one or more embodiments.

FIG. 1 is a block diagram illustrating a plug-in application recipe (PIAR) management system 100 according to an embodiment. The PIAR management system 100 includes functionality to recursively generate at least one PIAR.

As illustrated, the PIAR management system 100 includes a PIAR management application 108 and various other components. Embodiments may include more or fewer components than those illustrated. Components may be implemented in software and/or hardware. Specifically, components may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device. Components may be local to or remote from each other. Each component may be distributed over multiple applications and/or machines. Multiple components may be combined into one application and/or machine. Two or more components may be communicatively coupled via a local area network, a wide area network, the internet, an intranet, a cellular network, and/or combinations thereof. Operations described with respect to one component may instead be performed by another component. Additional embodiments and/or examples relating to computer networks are described below.

As described herein, the term "plug-in application" refers to the fact that an application's trigger(s) and/or action(s) logically 'plug in' to the PIAR and become part of the logic of a PIAR. For example, the PIAR management application 108, described in further detail below, may be organized according to a micro-services architecture, such that several independent services are plugged into the PIAR application. Each plugged-in service may provide monitoring service(s) specific to a particular application to support trigger(s) for the particular application, and/or action service(s) specific to the particular application to support executing action(s) for the particular application.

In an embodiment, a PIAR management application 108 provides a user interface 102 for creating a PIAR definition 150. A PIAR definition 150 may also be referred to as a PIAR specification. Specifically, the user interface 102 allows a user to select one or more triggers 104 and one or more corresponding actions 106 to be executed when the trigger(s) 104 are satisfied. As used herein, the trigger(s) 104 and action(s) 106 are referred to collectively as "operations" of the PIAR. Examples of PIARs include, but are not limited to: (a) responsive to detecting that a user's car is in the user's driveway (trigger), opening the user's garage door (action); (b) responsive to determining that a user's walked steps have not reached a particular goal by 5 p.m. (trigger), transmitting a notification to the user (action); (c) responsive to detecting a new sales contact in an address book or email (trigger), creating a new folder to store information about the sales contact (action). The user interface 102 may be a graphical user interface (GUI), a command line interface, or any other type of interface configured to receive user input for creating a PIAR definition 150.

In an embodiment, in addition to the trigger(s) 104 and associated action(s) 106, the user interface 102 includes options to specify a name of a PIAR definition, a trigger application that is an application to be monitored for detection of the trigger(s) 104, and/or an application to be used to execute the action(s) 106. The name of a particular PIAR may take many different forms. In an example, PIARs are given numerical names that correspond to an order in which the PIARs are created. The first PIAR created may be given the name "00001"; the second PIAR created may be given the name "00002"; and so on. In another example, PIARs are given descriptive names, which may be user-specified (e.g., "Notify sales when a lead is received") or systematically generated based on properties of the PIAR. One or more of the action(s) 106 may involve generating a new PIAR definition, and one or more of the action(s) 106 may be executed by the PIAR management application 108 itself. Multiple PIARs may have the same descriptive name but different identifiers. A PIAR definition 150 may also include information other than the trigger(s) 104 and action(s) 106.

In an embodiment, a PIAR may involve multiple actions performed in response to detecting a trigger. One or more of the actions may be performed concurrently or in a fixed sequence. A combination of concurrent and/or sequential actions may be used. The output of one action may be used as input to another action. For example, suppose a PIAR is created with a trigger defined as receiving an email from a prospective customer (e.g. receiving an email at an email address only given to prospective customers). In this example, a series of actions performed in response to receiving the email may include (1) determining whether the prospect is already listed in a customer relationship management (CRM) application, and (2) if the prospect is not already listed in the CRM application, adding the prospect to the CRM application and sending a notification email to a sales manager. Adding the prospect to the CRM application and sending the notification email to the sales manager may be performed concurrently or in a particular order. For example, the notification email may be sent only after receiving confirmation from the CRM application that the prospect was added successfully. Many different combinations of concurrent and/or sequential actions may be used in a PIAR.

In an embodiment, one or more actions in a PIAR may be performed conditionally, based on evaluation of the initiating trigger or, if the action is part of a series of actions, evaluation of output from a preceding action. For example, conditional logic (e.g., if, then, else, etc.) may be used to determine, in response to detecting a trigger, the particular sequence of actions, if any, to perform. The PAIR management system 100 may include an interface allowing a user to define such conditional logic for a particular PIAR. Further, evaluating a trigger and/or output of a preceding action may involve looping through multiple variable values. For example, a trigger or action may supply an array of values, and evaluating the trigger or action may involve iteratively evaluating (or "looping through") each of those values. Looping through such values may itself be subject to conditional logic. Many different combinations of conditional logic and/or looping through variables may be used to determine the particular action(s), if any, performed when a trigger is detected.

In an embodiment, a PIAR definition 150 includes one or more types of metadata. For example, metadata may identify a user who created the PIAR definition 150, a time and date of creation, an authorization level of the PIAR definition 150 (for example, whether the action(s) 106 are permitted to receive personally identifiable information), the plug-in application(s) associated with the trigger(s) 104 and/or action(s) 106, or any other type of metadata describing or associated with a PIAR. If a PIAR definition is generated recursively in the course of executing another PIAR, the recursively generated PIAR may be thought of as a "child" PIAR and the PIAR that generated it may be thought of as a "parent" PIAR. Metadata associated with a child PIAR may include information about the parent PIAR, directly in the child PIAR's metadata and/or by reference to the parent PIAR's metadata.

In an embodiment, the PIAR management system 100 includes one or more applications that are linked or 'plugged in' to the PIAR management application 108. An application 'plugged in' to the PIAR management application 108 may be referred to as a "plug-in application." A particular plug-in application may be used as a "trigger application," i.e., an application to be monitored for detection of a trigger condition. Alternatively or in addition, a particular plug-in application may be used as an "action application," i.e., an application that executes an action when a trigger condition is satisfied.

In an embodiment, in general, plug-in applications are applications that are (a) executing independently of the detection process of the PIAR management application 108, (b) not being controlled by the detection process of the PIAR management application 108, and/or (c) remote from the PIAR management application 108. Thus, the plug-in application, executing independent of the detection process of the PIAR management application 108 that detects the specified trigger(s) 104, may be referred to herein as an independently executing application. Further, one or more plug-in applications may be considered 'stand-alone' applications relative to the PIAR management application 108. That is, a plug-in application may provide its own user interface (e.g., a GUI) through which a user accesses the full functionality of the plug-in application. In this manner, the plug-in application provides functionality entirely independent of the PIAR management application 108 and does not depend on the PIAR management application 108 to function. A stand-along plug-in application is not a module or component of the PIAR management application 108. One or more plug-in applications and the PIAR management application 108 may be developed and supported by entirely distinct business entities than each other. As an example, FIG. 1 illustrates plug-in applications that include a search application 110, an email application 112, and an audio player application 114, which are independently executing stand-alone applications. Many different types of plug-in applications may be used, and the examples illustrated in FIG. 1 should not be construed as limiting one or more embodiments.

In an embodiment, the PIAR management application 108 stores PIAR definitions (e.g., PIAR definition 150) as PIAR definition objects 107. PIAR definitions may also be referred to herein as PIAR specifications. The definition objects 107 may be stored in a database 105, for example, in a file system, or in any other type of digital storage. The PIAR management application 108 may also store metadata associated with PIAR definitions in the database 105 or other storage. The metadata 109 may be stored within (i.e., as logical components of) definition objects 107 or separately. In an embodiment, definition objects 107 are stored in JavaScript Object Notation (JSON) format, with elements in the JSON structure corresponding to trigger(s) 104, action(s) 106, and/or metadata 109. The JSON structure may also include one or more elements corresponding to transformation operations to be applied to variables associated with PIAR trigger and/or action operations.

In an embodiment, functionality of a plug-in application that is accessible to the PIAR management application 108 is a subset of the plug-in application's full functionality. Specifically, a plug-in application may expose an application programming interface (API) providing access to certain functions and/or data of the plug-in application, without providing access to other functions and/or data of the plug-in application. In other words, the functionality exposed to the PIAR management application 108 may be a proper subset (a.k.a. strict subset) of the plug-in application's full functionality. For example, the API may be a restful state transfer (REST) API. Other types of APIs may be used. As an example, an email application may not expose email sending functionality to the PIAR management application 108, but may expose information about emails that have been received, such as the date, time, sender, recipient, subject line, and content of the email. As another example, a calendar application may not expose functionality to cancel events, but may expose information about events that have already been scheduled (e.g., date, time, location, participants, etc.) and/or functionality to schedule new events. The set of functionality exposed to the PIAR management application 108 may depend on one or more authorization policies. In an embodiment, the PIAR management application 108 stores an authorization token that it uses to authenticate access to a plug-in application's API. As an example, the PIAR management application 108 may prompt a user, via the user interface 102, to input a username and password to access an email application's API. The PIAR management application 108 may store the username and password in an encrypted token that it uses to request access to the exposed functions and/or data of the email application.

In an embodiment, the user interface 102 allows a user to specify triggers that do not correspond to functions or data natively exposed by a plug-in application. For example, a trigger application may expose data values that change over time, without natively exposing any functions that monitor or compare the data values as they change. A trigger may nonetheless be defined for monitoring the trigger application for changes in the data values over time. As another example, a trigger may look for an aggregate data value (e.g., summed or averaged over time or over a number of consecutive data retentions or changes), or a masked data value (e.g., a data value that indicates the presence or absence of data or a change in data, even though the data itself is masked to the PIAR management application 108 or the end user, or is altogether unavailable to the end user). Many different types of trigger conditions may be inferred, derived, or otherwise determined from a trigger application without being natively supported by the trigger application.

As an example, a search application 110 may be linked to (plugged into') the PIAR management application 108. Linking the search application 110 to the PIAR management application 108 may involve monitoring the search application 110 (e.g., via a REST API) and reporting, to the PIAR management application 108, the detection of triggers defined in relation to the search application 110. For example, a trigger may involve detecting the execution of a search for receipts via the search application 110. The search application 110 may be monitored via a corresponding service 111 that detects when a search for receipts is executed via the search application 110. The service 111 notifies the PIAR management application 108 if and when a search for receipts is executed via the search application 110. The service 111 may be implemented separately from the search application 110 or as a component (e.g., an installable module or plug-in) of the search application 110.

As another example, the search application 110 corresponds to a car sales application. A potential customer may search for a car from a database of advertised cars and request a meeting with a sales representative to purchase the car. The trigger condition may be defined as receiving a request for a sales meeting from a user that references one of the advertised cars.

In an embodiment, a plug-in application includes a monitoring system for notifying the PIAR management application 108 of predefined trigger conditions, with predefined parameters that may be customizable. For example, an application may include a monitoring system that notifies the PIAR management application 108 when an application-specific trigger such as a keyword search on email is satisfied. The application may allow a limited amount of customization for that application-specific trigger, allowing customization in some ways (such as specifying the keyword for the search) without allowing customization in other ways (such as, for example, whether the keyword is within N words of another keyword, or whether information about an earlier email with the keyword has already been detected and stored in a table).

In an embodiment, monitoring a plug-in application (e.g. using a service 111) to identify a triggering event is done on an ongoing basis. That is, the monitoring process is initiated and continues to operate until a terminating condition is satisfied. Thus, a particular PIAR may be evaluated and executed many times, in response to many triggering events identified by the associated monitoring process. In general, a PIAR does not cease to operate upon the first instance of the selected triggering event. For example, a PIAR that opens a garage door in response to detecting a vehicle in the driveway may operate in perpetuity and cause the garage door to open dozens, hundreds, or even thousands of times. A monitoring process associated with a particular PIAR may operate in perpetuity until it is manually terminated by a user (e.g., via the user interface 102). Alternatively, a PIAR definition may include a terminating condition, such as a certain length of time to operate or a maximum number of times to perform actions in response to triggers. Typically a PIAR is created with the intent that it functions as an automated background service, continuing to operate in perpetuity, without further manual intervention.

In an embodiment, the search application 110 (or other application plugged into the PIAR management application 108) is not in any way affected by the execution of the PIAR management application 108 which uses at least one of the fields managed by the search application 110 for detecting the trigger(s) 104. The PIAR management application 108 may correspond to micro-services that provide altogether different functionality than the independently executing search application 110. The PIAR management application 108 may determine that the action(s) 106 have been triggered when a change in the field(s) managed by the independently executing search application 110 satisfy one or more threshold criteria, such as a certain value or aggregated value. As an example, a field managed by the search application 110 may specify a location. Search results associated with the location are to be presented in response to a query. A change in city may satisfy the threshold criteria. The threshold criteria specified to the PIAR management application 108 may be different than any threshold criteria supported by the built-in monitoring process(es) of the plug-in application, even though the threshold criteria may be based on variables that are accessible from the plug-in application and even though such variables may change over time. A parent PIAR may generate a child PIAR (as discussed below) for the purpose of determining, on an ongoing basis, whether a particular threshold criterion is satisfied. The PIAR management application 108 may execute (directly or by causing execution by another process) the action(s) 106 in response to detecting that the action(s) 106 have been triggered.

Similar to a trigger application (e.g. search application 110), an action application (e.g., email application 112 or audio player application 114) is linked or plugged into the PIAR management application 108. An action application is an application that executes an action as directed or requested by the PIAR management application 108 (although the PIAR management application 108 may also be said to "execute" the action in the sense that the PIAR management application 108 initiates execution of the action). The PIAR management application 108 requests execution of actions in response to detection of triggers as described above. The action applications may be linked to the PIAR management application 110 via respective services 111. A service 111 may be implemented separately from or as a component of an action application. A service 111 may use an application programming interface (API) corresponding to an action application, to use the action application for executing an action according to a PIAR. A particular action application may also be a trigger application. That is, the same application may expose one or more triggers while also exposing an API for executing actions. The same application may be used as both a trigger application and an action application in the same PIAR, or in different PIARs.

In an embodiment, the PIAR management application 108 is itself an action application. The PIAR management application 108 may execute an action that generates a new PIAR. As an example, a new PIAR may be generated for managing client purchases. The new PIAR may define a trigger as a first purchase by a client. The new PIAR may define actions such as creating a database record for storing records of client purchases or creating a product recommendation list based on completed purchases by the client. Generating a new PIAR as part of a PIAR action may be thought of as recursively generating a PIAR. Recursively generating a PIAR is discussed in further detail below.

In an embodiment, the PIAR management application 108 supports PIAR definitions that involve a series of actions. For example, in response to a particular trigger, a PIAR may perform a particular action, "Action A." The output of Action A may then be used as input to another action, "Action B." The output of Action B may then be used as input to another action, "Action C," and so on. Functions and/or data exposed by Action A may be available as input to Action B and/or as input to subsequent actions, such as Action C. Functions and/or data exposed by a later action, such as Action C, may not be available as input to an earlier action, such as Action B or action A. For example, if Action B completes before Action C completes, then it is not possible for Action B to receive input from Action C.

In an embodiment, the user interface 102 includes options to specify one or more transformation operations to be applied to one or more variables used in a PIAR. A transformation operation is an operation that takes a particular value of a variable and modifies it to obtain a transformed value. For example, a transformation operation may concatenate data (e.g., two strings), filter out undesirable data (e.g. inappropriate information, or sensitive information such as personally identifiable information, convert lowercase to uppercase (or vice versa), transform a variable of one data type to a variable of another data type (e.g., a string to a date or number), or perform any other type of transformation that may be applied to variables. Embodiments should not be considered limited to any particular type of variable or type of transformation.

3. Recursive Plug-In Application Recipe Generation

Figure 2:
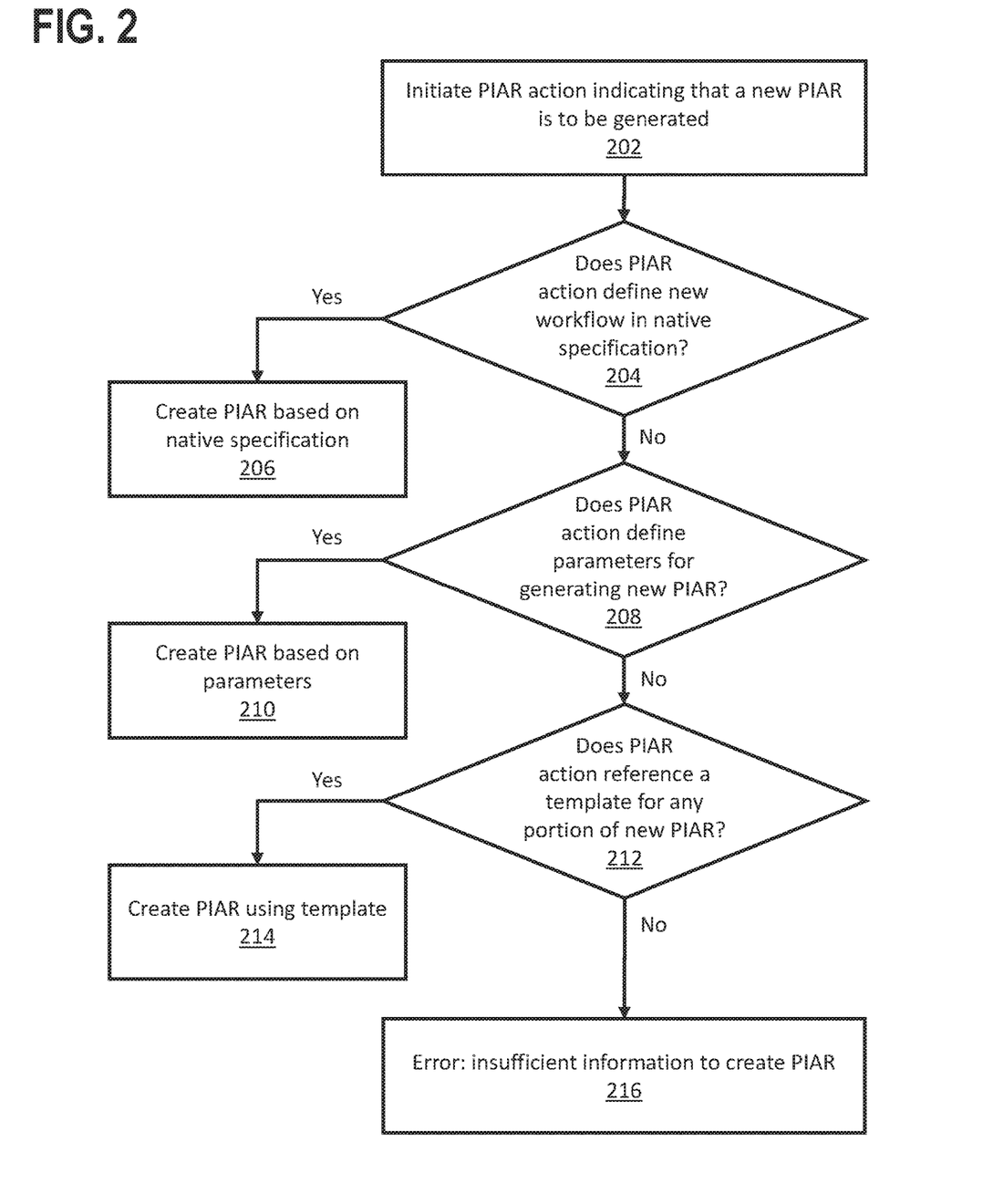
FIG. 2 illustrates operations for recursively generating at least one plug-in application recipe in accordance with one or more embodiments.

In an embodiment, the PIAR management application recursively generates a PIAR via the execution of a PIAR action of an initial PIAR being executed. FIG. 2 includes an example set of operations generating a new PIAR. Other operations not described herein may be used instead and/or in addition to the described operations. One or more operations illustrated in FIG. 2 may be modified, rearranged, or omitted altogether. Accordingly, the particular sequence of operations illustrated in FIG. 2 should not be construed as limiting the scope of one or more embodiments.

In an embodiment, each of a set of plug-in applications exposes an interface to a PIAR management application. The interface may be exposed by each of the plug-in applications via a service that is separated from the respective linked application or is included as a component of each respective linked application. The interface may be used, by the PIAR management application, to monitor PIAR triggers corresponding to conditions that may satisfied by a linked application. The interface may be used, by the PIAR management application, to request a linked application to execute PIAR actions. The linked applications may operate independently and without control by the PIAR management application. The linked applications may operate independently of each other and/or of the PIAR management application, for example, without having one application control another and/or without having the applications controlled by the PIAR management application. The linked applications may be considered independent even if the applications expose limited interfaces for monitoring pre-defined triggers and/or for causing pre-defined actions, so long as the consumer of the interface does not retain any control over (a) how the monitoring is performed, as it is being performed, beyond the pre-defined fields that are initially provided, via the interface, to define what is to be monitored, or (b) how the actions are performed, as they are being performed, beyond the pre-defined fields that are initially provided, via the interface, to define what is to be performed.

The linked applications operate independently of each other and perform different monitoring or functionality according to their respective exposed interfaces. Although the different applications operate independent of each other, they may interact with each other through the PIAR management application. For example, a first application may be plugged into the PIAR management application (at least) for monitoring whether an application-specific condition (specific to the first application) is satisfied, optionally based on criteria provided to the first application via an interface exposed by the first application. A second application may be plugged into the PIAR management application (at least) for triggering application-specific actions (specific to the second application), optionally based on criteria provided to the second application via an interface exposed by the second application. The PIAR management application provides a GUI for defining which triggers should, when activated, cause which actions. In the example, a trigger defined for the first application may cause an action defined for the second application, even though the first and second applications otherwise operate independently of each other and do not necessarily have any knowledge of each other or any ability to allow or prevent other applications from being plugged into the PIAR management application.

In an embodiment, a particular application may be linked to the PIAR management application based in part on authentication credentials received by a GUI corresponding to the PIAR management application. The authentication credentials may be associated with a particular user of a set of users with user accounts managed by the particular application. Linking the particular application to the PIAR management application may include storing authentication credentials for use in polling the particular application by the PIAR management application. The PIAR management application may poll the particular application to obtain data corresponding to detection of PIAR triggers. Linking the particular application to the PIAR management application may include establishing a reusable data pipeline for transferring data from the particular application to the PIAR management application in a continuous, periodic, or sporadic manner.

In an embodiment, the PIAR management application receives, via a GUI, an initial PIAR specification defining (a) a first PIAR trigger and (b) a first PIAR action. The initial PIAR is stored in a PIAR repository. The PIAR management application configures a monitoring service to detect at least one condition corresponding to the first PIAR trigger. The PIAR management application may configure a service to execute the monitoring operation via an interface exposed by the particular application.

In an embodiment, the PIAR management application receives, from a linked application, data associated with the first PIAR trigger. The PIAR management application may receive the data directly from the linked application or via a separate service configured to monitor the operations and/or data corresponding to the linked application. The PIAR management application may determine, based on the data, whether the first PIAR trigger has been satisfied. If the first PIAR trigger has not been satisfied, the first PIAR action is not executed. If the first PIAR trigger has been satisfied, then the corresponding first PIAR action is executed or caused to be executed by the PIAR management application. One or more portions of the first PIAR action having been defined by a GUI and stored by the PIAR management application, may be available to the PIAR management application.

In an embodiment, the first PIAR action may include a PIAR specification that defines a second PIAR trigger and a second PIAR action. In response to determining that the first PIAR trigger is satisfied, the PIAR management application initiates execution of the corresponding first PIAR action (Operation 202). The first PIAR action involves generating a new PIAR including (a) the second PIAR trigger and (b) the second PIAR action that is to be executed in response to detecting the second PIAR trigger is satisfied. The PIAR management application may generate the new PIAR by, for example, using a representational state transfer (REST) Application Programming Interface (API) to create the new PIAR in accordance with the PIAR specification.

When a first PIAR's action involves generating a new PIAR, the first PIAR may be referred to as the "parent PIAR" and the new PIAR may be referred to as the "child PIAR." Regardless of the specific method(s), discussed herein, that are used to generate the PIAR, the child PIAR's specification may include data related to its creation. The child PIAR's specification may include data identifying the parent PIAR. In an example, the child PIAR includes a filed called "parentPIAR," the value of which is the name or some other identifier corresponding to the parent PIAR. Identifying the parent PIAR in a child PIAR's specification may be useful, for example, for auditing purposes and/or for referencing the parent PIAR in a child PIAR's action(s). Alternatively or in addition, the child PIAR may include some or all of the parent PIAR's metadata. Alternatively or in addition, the child PIAR may include other information about its creation, such as a timestamp of creation, a process identifier corresponding to a process that created the child PIAR, an identifier corresponding to a plug-in application that triggered the child PIAR's creation, etc. Alternatively or in addition, the child PIAR's specification may identify a user whose credentials were used to generate the child PIAR, e.g., to monitor the parent PIAR's trigger(s). A child PIAR that was generated using one user's credentials may be configured to use the same user's credentials and/or a different user's credentials. Information about the child PIAR's creation may be used to automate various actions, such as sending an email to an administrator indicating that that child PIAR was created.

In an embodiment, a child PIAR may itself include an action that generates another child PIAR, for which the first child PIAR is considered the parent PIAR. The PIAR management application may support many different levels of PIAR "ancestry" in this manner. As with a parent PIAR, a child PIAR may not execute any actions, or cause any actions to be executed, until one or more trigger conditions are satisfied. In addition, a child PIAR may be configured to start on a specific date/time and/or terminate on a specific date/time. A start or termination date/time may be an absolute date/time (e.g., "Jan. 1, 2018 at 12:01 a.m.") or a relative date/time (e.g., "next Monday at 9:00 a.m." or "in ten days at 11:59 p.m."). The PIAR management application may terminate a child PIAR on its termination date/time. Alternatively or in addition, a child PIAR may have a termination condition. In an example, a child PIAR is configured to execute actions ten times. The child PIAR's trigger condition(s) are satisfied ten times and the PIAR executes the corresponding action(s) each time. The PIAR management application then terminates the child PIAR. In another example, the child PIAR defines an action to email a user. If the user replies to the email with the word "unsubscribe," the PIAR management application terminates the child PIAR. The PIAR management application may terminate a child PIAR even if the child PIAR's trigger condition(s) have never been satisfied. A child PIAR may inherit its start and/or termination condition(s) from its parent PIAR. A termination condition may also include instructions to generate a new child PIAR. When the PIAR management application terminates the child PIAR, it generates the new child PIAR according to those instructions. In an example, a parent PIAR includes an action to generate a self-replicating child PIAR with a "life span" of one week. When the child PIAR has been active for one week, the PIAR management application terminates the child PIAR and generates a new child PIAR that, again, has a "life span" of one week. In an embodiment, by default, a child PIAR does not have a termination date/time or termination condition.

In an embodiment, the PIAR management application determines whether the parent PIAR's action specifies the child PIAR with a native specification that may be used by the PIAR management application (Operation 204). If a native specification is specified by the parent PIAR's action, then the PIAR management application generates the child PIAR using the native specification (Operation 206). A native specification may not necessarily require any conversion operations by the PIAR management application, prior to storing the native specification as a new PIAR in a same PIAR repository as the first PIAR and thereby generating the child PIAR. The native specification may specify the attributes of a child PIAR including one or more of: PIAR title, PIAR trigger, trigger application, PIAR action, and action application. Alternatively, minimal conversion may be required to generate the new PIAR. In an embodiment, the PIAR management application generates the new PIAR using at least a portion of the information corresponding to the first PIAR trigger. As an example, the first PIAR trigger may correspond to a potential client. The name or other attributes of the potential client (not available prior to the occurrence of the first PIAR trigger) may be incorporated into the native specification that is stored in the PIAR repository to generate the new PIAR. In an embodiment, the PIAR management application, may receive instructions via a GUI to automatically generate one or more components of the new PIAR. As an example, the PIAR management application may receive instructions to generate a title for the new PIAR, the title not being explicitly specified by a user. The PIAR management application may generate the title based on information received in the first PIAR trigger. The PIAR management application generates the title based on the PIAR trigger or the PIAR actions indicated in the new PIAR.

In an embodiment, the PIAR management application determines whether the first PIAR action identifies any parameters for generating the new PIAR (Operation 208). If the first PIAR action identifies any parameters for generating the new PIAR, then the PIAR management application generates the new PIAR using the parameters specified by the first PIAR action (Operation 210). As an example, the first PIAR action may include metadata for a PIAR trigger of the new PIAR. The metadata may indicate one or more triggers, one or more trigger types, a number of trigger types, and/or condition metadata for determining whether or not the PIAR trigger of the new PIAR is satisfied. As another example, the first PIAR action may specify an action application which is to be used to perform the PIAR action, one or more action types available to a PIAR application, and/or content data for enriching a PIAR action. As an example, a PIAR action may specify a PIAR type "email welcome letter to potential client" without specifying the PIAR application (Gmail, Outlook, iCloud, an Internet Message Access Protocol (IMAP) request, etc.) that is to be used for completing the PIAR action. The PIAR management application may determine which email application(s) is/are available to a user of a user account associated with the PIAR action, and use any of the available email applications.

In an embodiment, the PIAR management application determines whether the first PIAR action references a PIAR template. As an example, the PIAR management application may receive a selection of one or more PIAR templates to be used by the PIAR management application to create a new PIAR. One or more PIAR templates may be used to populate at least a portion of the new PIAR. For example, a PIAR template may be used to populate one or more of: the PIAR name, the PIAR trigger, and/or the PIAR action. The PIAR management application may allow at least partial modification to one or more of the PIAR name, the PIAR trigger, and/or the PIAR action. Any restrictions to modification may be specified by the PIAR template.

In an embodiment, the PIAR trigger of the new PIAR and the PIAR trigger of the first PIAR are concurrently monitored. Monitoring of the PIAR trigger of the new PIAR is initiated after creation of the new PIAR. Accordingly, prior to creation of the new PIAR, monitoring for the two PIAR triggers was not concurrently executed.

Figure 3:
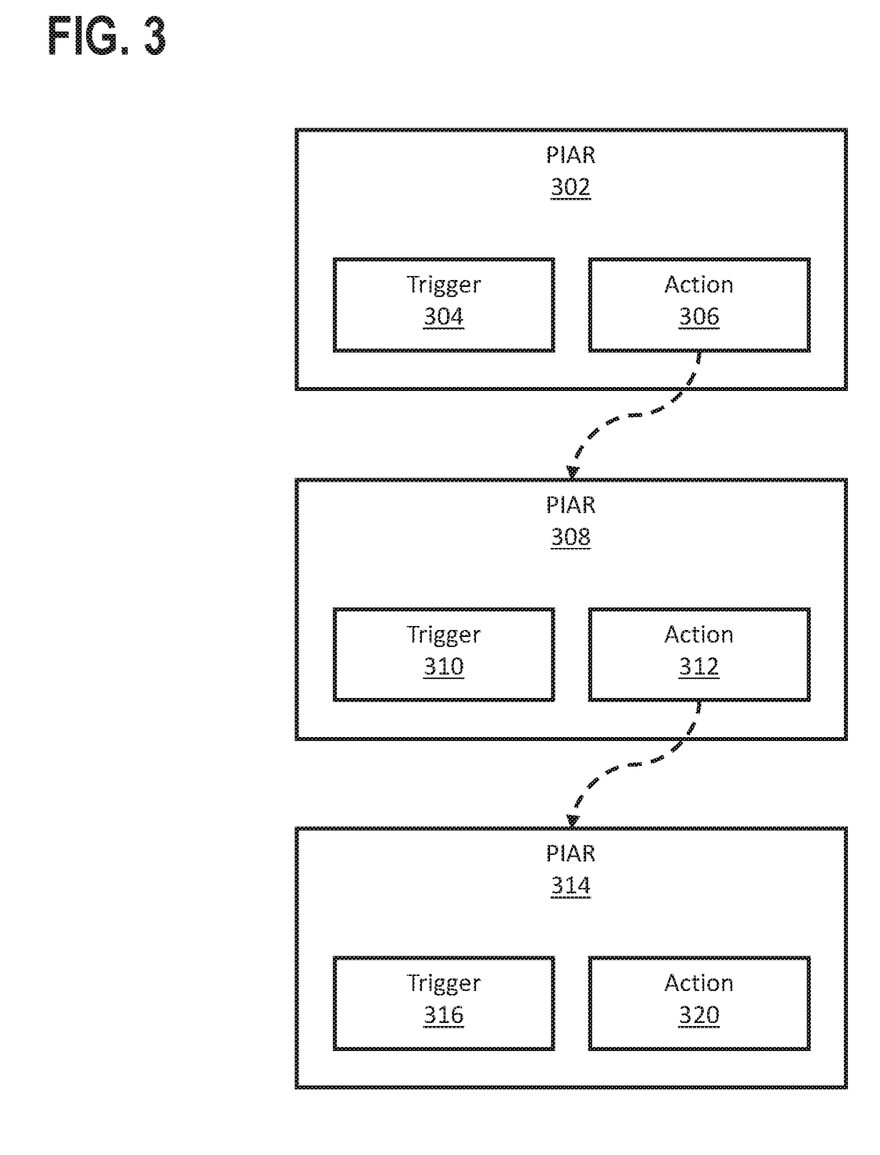
FIG. 3 illustrates an example of recursively generating plug-in application recipes in accordance with one or more embodiments.

FIG. 3 illustrates an example of recursively generating plug-in application recipes in accordance with one or more embodiments. The illustrations in FIG. 3 are provided for exemplary purposes only and should not be construed as limiting one or more embodiments.

In the example illustrated in FIG. 3, a PIAR 302 includes a trigger 304 and an action 306. The action 306 involves generating another PIAR. When a PIAR management application (not shown) detects that the trigger 304 is satisfied, the PIAR management application executes the action 306 by generating a PIAR 308. PIAR 308 may be thought of as a "child" PIAR of PIAR 302. PIAR 308 includes its own trigger 310 and action 312. If the trigger 304 is satisfied again, the PIAR management application may generate another child PIAR (not shown). Depending on the trigger 304 and/or any termination condition(s) associated with the PIAR 302, the PIAR management application may generate any number of child PIARs based on the action 306.

In the example illustrated in FIG. 3, the child PIAR 308's action 312 involves generating another PIAR. When the PIAR management application detects that the trigger 310 is satisfied, the PIAR management application executes the action 312 by generating a PIAR 314. PIAR 314 may be thought of as a "child" PIAR of PIAR 308. PIAR 314 may also be thought of as a child, grandchild, or descendant of PIAR 302. PIAR 314 includes its own trigger 316 and action 320. If the trigger 310 is satisfied again, the PIAR management application may generate another child PIAR (not shown). Depending on the trigger 310 and/or any termination condition(s) associated with the PIAR 308, the PIAR management application may generate any number of child PIARs based on the action 312.

In the example illustrated in FIG. 3, the action 320 may or may not also involve generating another PIAR. The PIAR management application may recursively generate any number of "levels" or "generations" of child PIARs, if the actions of child PIARs involve generating additional child PIARs.

4. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
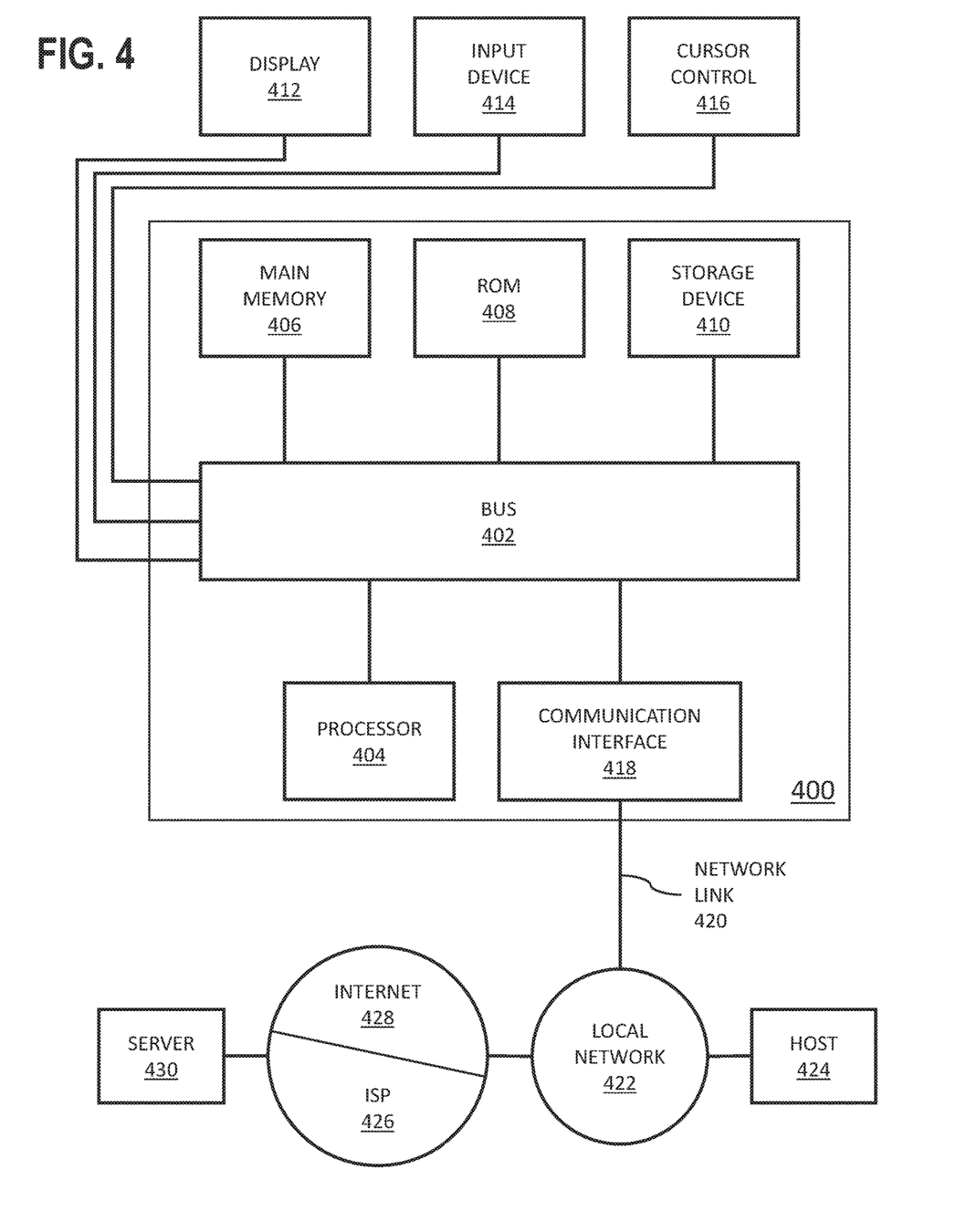
FIG. 4 illustrates a system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 340 might transmit a requested code for an application program through Internet 428, ISP 426, local network 422 and communication interface 418.

The received code may be executed by processor 404 as it is received, and/or stored in storage device 410, or other non-volatile storage for later execution. In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

The invention claimed is:

1. A non-transitory computer readable medium comprising instructions which, when executed by one or more hardware processors, causes performance of operations comprising:

managing, by a plug-in application recipe (PIAR) management application, a particular PIAR in an active state, wherein the PIAR management application manages PIAR specifications, each PIAR specification identifying
   (a) a trigger for which one or more trigger variables, values of which are necessary to evaluate the trigger on an ongoing basis, are exposed by a first plug-in application to the PIAR management application, wherein an instance of evaluating the trigger comprises determining whether a condition is satisfied based at least in part on one or more values of the one or more trigger variables, and
   (b) an action for which a second plug-in application exposes an interface to the PIAR management application for causing the second plug-in application to carry out the action, wherein an instance of evaluating the action comprises carrying out the action based on one or more values of one or more input variables that are input to the action in the PIAR specification,
   wherein the PIAR management application makes the action conditional on the trigger on an ongoing basis,
   wherein the particular PIAR comprises a particular trigger and a particular action,
   wherein the particular action comprises a child PIAR specification that defines, for a child PIAR, a second trigger and a second action to be executed when the second trigger is satisfied;
detecting, by the PIAR management application that the particular trigger is satisfied; and
in response to detecting that the particular trigger is satisfied, creating the child PIAR, wherein the PIAR management application monitors the second trigger concurrently with the particular trigger, wherein the PIAR management application did not monitor the second trigger before creating the child PIAR.

2. The medium of claim 1, wherein the operations further comprise, prior to detecting that the particular trigger is satisfied:
   receiving, by the PIAR management application via a graphical user interface provided by the PIAR management application, an initial PIAR specification defining (a) the particular trigger and (b) the particular action; and
   configuring, by the PIAR management application, a monitoring operation to detect one or more conditions based on the particular trigger from the initial PIAR specification.

3. The medium of claim 2, wherein configuring the monitoring operation comprises configuring, based at least in part on a first interface exposed by the first plug-in application, a service to monitor the first plug-in application to determine whether the first plug-in application performs an operation corresponding to the particular trigger.

4. The medium of any claim 1, wherein the first plug-in application and the second plug-in application operate independently of each other and independently of the PIAR management application.

5. The medium of claim 1, wherein the operations further comprise, prior to detecting that the particular trigger is satisfied:
   linking the first plug-in application to the PIAR management application based at least in part on authentication credentials received via a graphical user interface provided by the PIAR management application, wherein the authentication credentials are associated with a particular user account of a plurality of user accounts managed by the first plug-in application.

6. The medium of claim 5, wherein the linking comprises storing the authentication credentials for use in polling the first plug-in application for data.

7. The medium of claim 5, wherein the linking comprises establishing a secure reusable data pipe for receiving data from the first plug-in application.

8. The medium of claim 1, wherein creating the child PIAR comprises:
   using, by the PIAR management application, a representational state transfer (REST) Application Programming Interface (API) to create the child PIAR in accordance with the child PIAR specification.

9. The medium of claim 1, wherein the operations further comprise, prior to detecting that the particular trigger is satisfied:
   receiving, via a graphical user interface provided by the PIAR management application, a native PIAR specification for creating the child PIAR, wherein the native PIAR specification is stored, in a PIAR repository, as the child PIAR and is executable as the child PIAR by the PIAR management system.

10. The medium of claim 1, wherein the operations further comprise, prior to detecting that the particular trigger is satisfied:
    receiving, by a graphical user interface provided by the PIAR management application, a native title of the child PIAR, wherein the child PIAR is stored, in a PIAR repository, using the native title.

11. The medium of claim 1, wherein the operations further comprise, prior to detecting that the particular trigger is satisfied:
    receiving, by a graphical user interface provided by the PIAR management application, a selection to automatically generate a title of the child PIAR, wherein creating the child PIAR comprises storing the child PIAR using a title automatically generated based at least in part on the second trigger and/or the second action.

12. The medium of claim 1, wherein the operations further comprise, prior to detecting that the particular trigger is satisfied:
    receiving, by a graphical user interface provided by the PIAR management application, PIAR trigger metadata that indicates, for the child PIAR: a PIAR trigger application from which data is needed to satisfy the second trigger, a trigger type of one or more trigger types available for the PIAR application, and/or condition metadata for determining whether or not the second trigger is satisfied.

13. The medium of claim 1, wherein the operations further comprise, prior to detecting that the particular trigger is satisfied:
    receiving, by a graphical user interface provided by the PIAR management application, PIAR action metadata that indicates, for the child PIAR: a PIAR action application on which the second action is to be performed, an action type of one or more action types available for the PIAR application, and/or content metadata for enriching the second action.

14. The medium of claim 1, wherein the operations further comprise, prior to detecting that the particular trigger is satisfied:
    receiving, by a graphical user interface provided by the PIAR management application, a selection of one or more PIAR templates to be used by the PIAR management application to create the child PIAR, wherein the one or more PIAR templates populate at least part of a PIAR name, the second trigger, and/or the second action, and allow at least partial modification to at least part of the PIAR name, the second trigger, and/or the second action.

15. The medium of claim 1, wherein the PIAR management application stores PIAR specifications in a PIAR repository that is accessible via a particular authenticated account of the PIAR management application.

16. The medium of claim 1, wherein the second action comprises another child PIAR specification that defines, for the other child PIAR, a third trigger and a third action to be executed when the third trigger is satisfied, and wherein the operations further comprise:
   detecting that the second trigger is satisfied; and
   in response to detecting that the second trigger is satisfied:
      creating the other child PIAR.

17. The medium of claim 1, wherein the child PIAR is associated with a start condition that is not satisfied at the time the child PIAR is created, and wherein the PIAR management application begins monitoring the second trigger when the start condition is satisfied.

18. The medium of claim 1, wherein the child PIAR is associated with a termination condition, and wherein the PIAR management application stops monitoring the second trigger when the termination condition is satisfied.

19. A method comprising:
   managing, by a plug-in application recipe (PIAR) management application, a particular PIAR in an active state, wherein the PIAR management application manages PIAR specifications, each PIAR specification identifying
      (c) a trigger for which one or more trigger variables, values of which are necessary to evaluate the trigger on an ongoing basis, are exposed by a first plug-in application to the PIAR management application, wherein an instance of evaluating the trigger comprises determining whether a condition is satisfied based at least in part on one or more values of the one or more trigger variables, and
      (d) an action for which a second plug-in application exposes an interface to the PIAR management application for causing the second plug-in application to carry out the action, wherein an instance of evaluating the action comprises carrying out the action based on one or more values of one or more input variables that are input to the action in the PIAR specification,
   wherein the PIAR management application makes the action conditional on the trigger on an ongoing basis,
   wherein the particular PIAR comprises a particular trigger and a particular action,
   wherein the particular action comprises a child PIAR specification that defines, for a child PIAR, a second trigger and a second action to be executed when the second trigger is satisfied;
   detecting, by the PIAR management application that the particular trigger is satisfied; and
   in response to detecting that the particular trigger is satisfied, creating the child PIAR, wherein the PIAR management application monitors the second trigger concurrently with the particular trigger, wherein the PIAR management application did not monitor the second trigger before creating the child PIAR,
   wherein the method is performed by at least one device comprising a hardware processor.

20. A system comprising:
   one or more hardware processors; and
   one or more non-transitory computer-readable media storing instructions, which when executed by the one or more hardware processors, cause execution of operations comprising:
      managing, by a plug-in application recipe (PIAR) management application, a particular PIAR in an active state, wherein the PIAR management application manages PIAR specifications, each PIAR specification identifying
         (e) a trigger for which one or more trigger variables, values of which are necessary to evaluate the trigger on an ongoing basis, are exposed by a first plug-in application to the PIAR management application, wherein an instance of evaluating the trigger comprises determining whether a condition is satisfied based at least in part on one or more values of the one or more trigger variables, and
         (f) an action for which a second plug-in application exposes an interface to the PIAR management application for causing the second plug-in application to carry out the action, wherein an instance of evaluating the action comprises carrying out the action based on one or more values of one or more input variables that are input to the action in the PIAR specification,
      wherein the PIAR management application makes the action conditional on the trigger on an ongoing basis,
      wherein the particular PIAR comprises a particular trigger and a particular action,
      wherein the particular action comprises a child PIAR specification that defines, for a child PIAR, a second trigger and a second action to be executed when the second trigger is satisfied;
      detecting, by the PIAR management application that the particular trigger is satisfied; and
      in response to detecting that the particular trigger is satisfied, creating the child PIAR, wherein the PIAR management application monitors the second trigger concurrently with the particular trigger, wherein the PIAR management application did not monitor the second trigger before creating the child PIAR.

* * * * *

UNITED STATES PATENT AND TRADEMARK OFFICE
CERTIFICATE OF CORRECTION

PATENT NO. : 10,521,245 B2  
APPLICATION NO. : 15/794994  
DATED : December 31, 2019  
INVENTOR(S) : Chan et al.

It is certified that error appears in the above-identified patent and that said Letters Patent is hereby corrected as shown below:

In the Specification

In Column 2, Line 48, delete "Receipe" and insert -- Recipe --, therefor.

In Column 10, Line 50, delete ""parentPIAR,"" and insert -- "parent PIAR," --, therefor.

In Column 11, Lines 2-3, delete "that that" and insert -- that --, therefor.

In the Claims

In Column 19, Line 54, in Claim 4, after "of" delete "any".

Signed and Sealed this  
Twenty-third Day of March, 2021

Drew Hirshfeld  
*Performing the Functions and Duties of the*  
*Under Secretary of Commerce for Intellectual Property and*  
*Director of the United States Patent and Trademark Office*